United States Patent
Yan et al.

(10) Patent No.: US 7,410,733 B2
(45) Date of Patent: Aug. 12, 2008

(54) DUAL-LAYER EUV MASK ABSORBER WITH TRENCHES HAVING OPPOSING SIDEWALLS THAT ARE STRAIGHT AND PARALLEL

(75) Inventors: Pei-Yang Yan, Saratoga, CA (US); Hsing-Chien Ma, Fremont, CA (US); Scott R. Chegwidden, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 11/144,550

(22) Filed: Jun. 3, 2005

(65) Prior Publication Data
US 2005/0227152 A1    Oct. 13, 2005

Related U.S. Application Data

(63) Continuation of application No. 10/334,177, filed on Dec. 28, 2002, now Pat. No. 6,913,706.

(51) Int. Cl.
*G03F 1/00*    (2006.01)

(52) U.S. Cl. .......................................................... 430/5
(58) Field of Classification Search ................. 430/5, 430/322, 323, 324; 378/35
See application file for complete search history.

(56) References Cited

U.S. PATENT DOCUMENTS

| 6,479,195 B1 | 11/2002 | Kirchauer et al. | 430/5 |
| 6,699,625 B2 | 3/2004 | Lee et al. | 430/5 |
| 6,913,706 B2 * | 7/2005 | Yan et al. | 216/24 |

* cited by examiner

*Primary Examiner*—Stephen Rosasco
(74) *Attorney, Agent, or Firm*—George Chen

(57) ABSTRACT

A composite extreme ultraviolet light (EUV) mask absorber structure and method are disclosed to address the structural and processing requirements of EUV lithography. A first mask absorber layer anisotropically etched with minimal etch bias at a relatively fast etch rate, is combined with a highly-selective second mask absorber layer, to produce a mask absorber with desirable hybrid performance properties.

7 Claims, 6 Drawing Sheets

DUAL-LAYER EUV MASK ABSORBER WITH TRENCHES HAVING OPPOSING SIDEWALLS THAT ARE STRAIGHT AND PARALLEL

RELATED APPLICATION

This application is a continuation of an application filed on Dec. 28, 2002 having Ser. No. 10/334,177 now U.S. Pat. No. 6,913,706.

BACKGROUND OF THE INVENTION

Extreme ultraviolet (EUV) lithography, which is based upon exposure with the portion of the electromagnetic spectrum having a wavelength of 10-15 nanometers, can be used to print features with smaller critical dimension (CD) than other more conventional techniques, such as those utilizing deep ultraviolet (DUV) radiation. For example, an EUV scanner may use 4 imaging mirrors and a Numerical Aperture (NA) of 0.10 to achieve a CD of 50-70 nm with a depth of focus (DOF) of about 1.00 micrometer (um). Alternatively, an EUV scanner may use 6 imaging mirrors and a NA of 0.25 to print a CD of 20-30 nm although the DOF will be reduced to about 0.17 um.

Masking and reflection of EUV radiation brings about a unique set of challenges generally not encountered with DUV radiation. For example, a mask for DUV lithography is transmissive, and layers of materials such as chrome and quartz may be used to effectively mask or transmit, respectively, DUV radiation. Thus, a desired pattern on a DUV mask may be defined by selectively removing an opaque layer, such as chrome, to uncover portions of an underlying transparent substrate, such as quartz. However, virtually all condensed materials absorb at the EUV wavelength, so a mask for EUV lithography is reflective, and the desired pattern on an EUV mask is defined by selectively removing portions of an absorber layer ("EUV mask absorber") to uncover portions of an underlying mirror coated on a substrate, the mirror, or reflective multilayer ("ML"), generally comprising a number of alternating layers of materials having dissimilar EUV reflectivity constants.

Selective removal of portions of the EUV mask absorber generally involves etching trenches through portions of the EUV mask absorber material, and the CD uniformity and bias are highly dependent upon the accuracy of such etching. Two particular issues are etch bias within etched trenches, and prevention of overetching to a depth greater than desired. These issues may be related, since material and technique pairings associated with anisotropic etching may be associated with overetching, while pairings associated with enhanced prevention of overetching may be associated with more isotropic etching patterns and negative trench etch bias. Given the geometric tolerances required during selective removal of EUV mask absorber portions for a preferred masking result, specialized materials, compositions, and processes are needed.

BRIEF DESCRIPTION OF THE DRAWINGS

The present invention is illustrated by way of example and is not limited in the figures of the accompanying drawings, in which like references indicate similar elements. Features shown in the drawings are not intended to be drawn to scale, nor are they intended to be shown in precise positional relationship.

DETAILED DESCRIPTION

In the following detailed description of embodiments of the invention, reference is made to the accompanying drawings in which like references indicate similar elements. The illustrative embodiments described herein are disclosed in sufficient detail to enable those skilled in the art to practice the invention. The following detailed description is therefore not to be taken in a limiting sense, and the scope of the invention is defined only by the appended claims.

Conventional EUV masks use chromium as a mask absorber layer. A typical EUV masking scenario may have a substrate layer, a reflective multi-layer, a buffer layer, and a chromium mask absorber layer, with a trench formed through the chromium mask absorber layer and the buffer layer to expose the reflective multi-layer to incident EUV radiation directed into the trench. Chromium, a material widely used for masking radiation in microelectronic fabrication, is relatively uneasy to etch as compared with many other metals when using conventional etch chemistries, such as those based upon chlorine. For example, using chlorine and oxygen based plasma etching chemistries to produce a volatile chromium byproduct, $CrO_2Cl_2$, chromium etches at a rate of about 3-4 angstoms per second, as compared with etch rates well over 20 or 30 angstroms per second for other metals. One of the other challenges associated with chromium as applied to form features of very small dimension, as in EUV masking applications, is negative etch bias upon etching. As would be apparent to one skilled in the art, the term "negative etch bias" is used in reference to etching in a direction away from the center of the trench, which results in a trench having a wider bottom than top, and trench sidewalls that are out of parallel. For example, using the aforementioned chlorine and oxygen plasma etch chemistry to trench through a chromium layer of about 100 nanometers in thickness, the negative etch bias may be as large as 50-80 nanometers. As applied to an EUV masking scenario, negative etch biases this large require data bias compensation. In the case of very small microelectronic feature sizes with pitch-limited features, mask absorber layers comprising only chromium may have reached their limit of applicability. The inventive solution this challenge is a dual-layer EUV mask absorber having a chromium mask absorber layer most closely adjacent the buffer layer, and another EUV mask absorber layer adjacent the chromium which have more preferable etching characteristics.

Figure 1A:
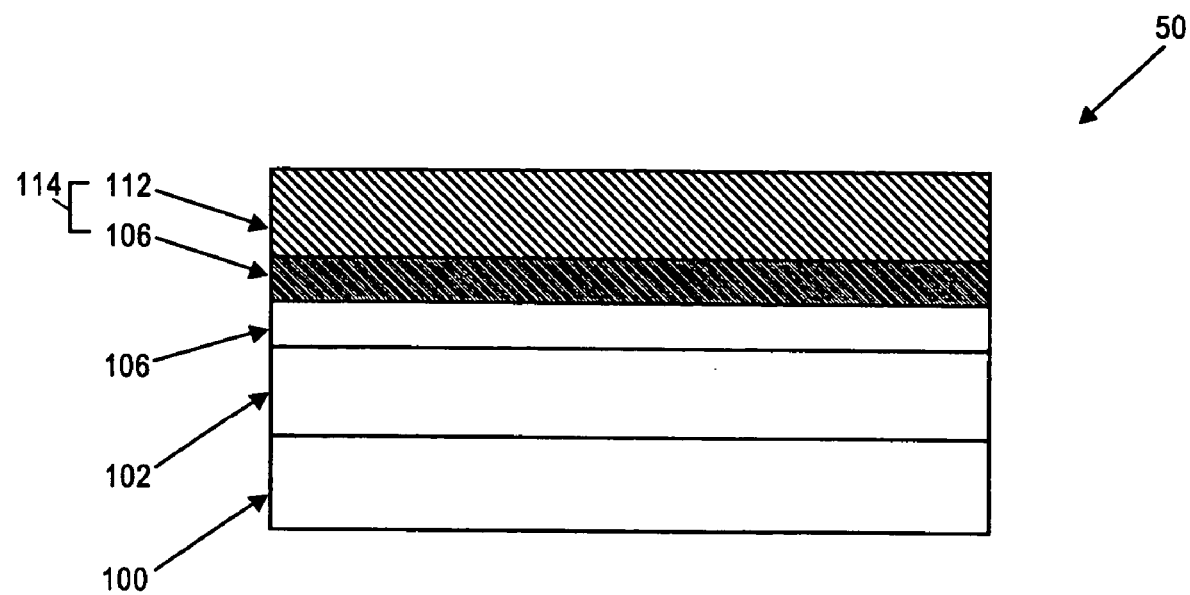
FIGS. 1A-1I are cross sectional views of various aspects of one embodiment of an EUV mask according to the present invention.

Referring to FIG. 1A, a cross sectional view of one embodiment of the invention is depicted, wherein a reflective multi-layer (102) is positioned between a substrate layer (100) and a buffer layer (104), and a dual-layer EUV mask absorber (114) is positioned adjacent the buffer layer (104), the dual-layer EUV mask absorber (114) comprising a chromium mask absorber layer (106) and a tantalum nitride mask absorber layer (112). The substrate layer (100), preferably comprising a material with a low defect level and a smooth surface such as glass or glass-ceramic with a low coefficient of thermal expansion ("CTE"), preferably is used as the starting material for an EUV mask of the present invention. In certain cases, the substrate (100) may be formed from silicon despite the relatively large CTE of silicon, so long as heat can be removed uniformly and effectively during exposure.

The reflective multi-layer (102) preferably comprises about 20-80 pairs of alternating layers of a high index of refraction material and a low index of refraction material. As would be apparent to one skilled in the art, a high index of refraction material includes elements with high atomic number which tend to scatter EUV light, and a low index of refraction material includes elements with low atomic number which tend to transmit EUV light. The choice of materials for the reflective multi-layer (102) depends upon the illumination wavelength ("lambda"). To a first approximation, each layer has a thickness of about one quarter of lambda. More specifically, the thickness of the individual layers depends on the illumination wavelength, lambda, and the incidence angle of the illumination light. For EUV, the wavelength is about 13.4 nm and the incidence angle is about 5 degrees. The thicknesses of the alternating layers are tuned to maximize the constructive interference of the EUV light reflected at each interface and to minimize the overall absorption of the EUV light. The reflective multi-layer (102) preferably can achieve about 60-75% reflectivity at the peak illumination wavelength. In one embodiment, the reflective multi-layer (102) comprises about 40 pairs of alternating layers of a high index of refraction material and a low index of refraction material. For example, each high index of refraction layer may be formed from about 2.8 nanometer thick molybdenum while each low index of refraction material may be formed from about 4.2 nanometer thick silicon. As needed, a capping layer, such as about 11.0 nanometer thick silicon, may comprise the top of the reflective multi-layer (102) to prevent oxidation of molybdenum by exposure to the environment.

The reflective multi-layer (102) preferably is formed over the substrate (100) using ion beam deposition or DC magnetron sputtering. The thickness uniformity preferably is better than 0.8% across the substrate (100). Ion beam deposition may result in less perturbation and fewer defects in the upper surface of the reflective multi-layer (102) because the deposition conditions usually may be optimized to smooth over any defect on the substrate layer (100). DC magnetron sputtering may be more conformal, thus producing better thickness uniformity, but substrate (100) defect geometry tends to propagate up through the alternating layers to the upper surface of the reflective multi-layer (102).

Referring again to FIG. 1A, a buffer layer (104) is positioned adjacent the reflective multi-layer (102). The buffer layer (104) preferably has a thickness between about 20 nanometers and about 50 nanometers and comprises a material such as silicon dioxide formed using a conventional low temperature process, preferably at a temperature less than about 150 degrees Celsius, to prevent interdiffusion of the alternating layers comprising the underlying reflective multi-layer (102). The buffer layer may also comprise insulative materials such as silicon oxynitride or carbon, and may be deposited using other conventional techniques such as RF magnetron sputtering.

The depicted dual-layer mask absorber (114), preferably less than about 130 nanometers in thickness, comprises two distinct mask absorber layers—a chromium mask absorber layer (106) and a tantalum nitride mask absorber layer (112). The chromium and tantalum nitride material comprising each layer preferably is substantially homogeneous throughout the layer, and the tantalum nitride mask absorber layer (112) preferably is more than about two times as thick as the chromium mask absorber layer (106). The pairing of chromium and tantalum nitride as a dual-layer mask absorber (114) has several advantages. Tantalum nitride etches much more anisotropically as compared with chromium, with a negative etch bias of between 0 and 10 nanometers for a 100 nanometer thick layer. Tantalum nitride also etches relatively fast—between about 32 and about 37 angstroms per second using chlorine plasma, as compared with chromium, which etches at a rate about 1/10 that of tantalum nitride with a chlorine and oxygen plasma (about 3-4 angstroms per second). The pairing of tantalum nitride and chromium is desirable from an etching control standpoint as well, since tantalum nitride may be etched with a chlorine plasma, and chromium will only substantially etch with a chlorine plasma if oxygen is also present—which facilitates the opportunity to etch with a chlorine plasma through the thickness of the tantalum nitride and have a natural pause in etching until oxygen is added to the etching plasma, after which the chromium is etched. Etching of the dual-layer mask absorber (114) is discussed in further detail below. Each of the chromium (106) and tantalum nitride (112) mask absorber layers may be formed using conventional techniques, such as DC sputtering, ion beam deposition, and atomic layer chemical vapor deposition.

The combination of a substrate (100), reflective multi-layer (102), buffer layer (104), and dual-layer mask absorber (114) comprises a mask blank (50) which may be further processed to form an EUV mask, as illustrated in FIGS. 1B-1I.

Figure 1B:
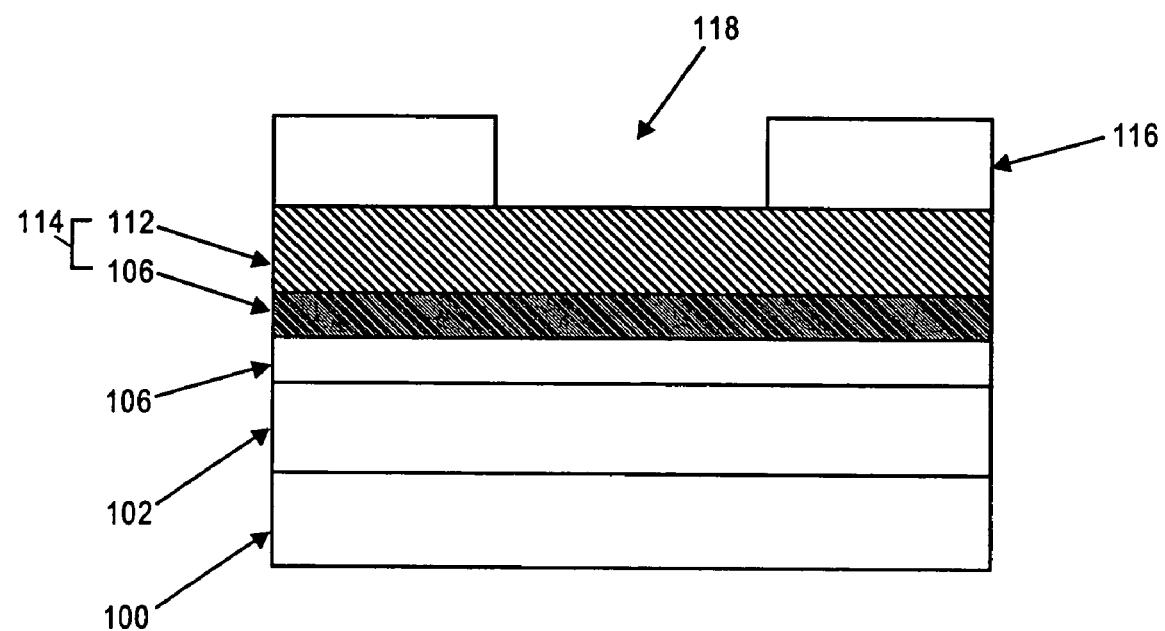
Figure 1C:
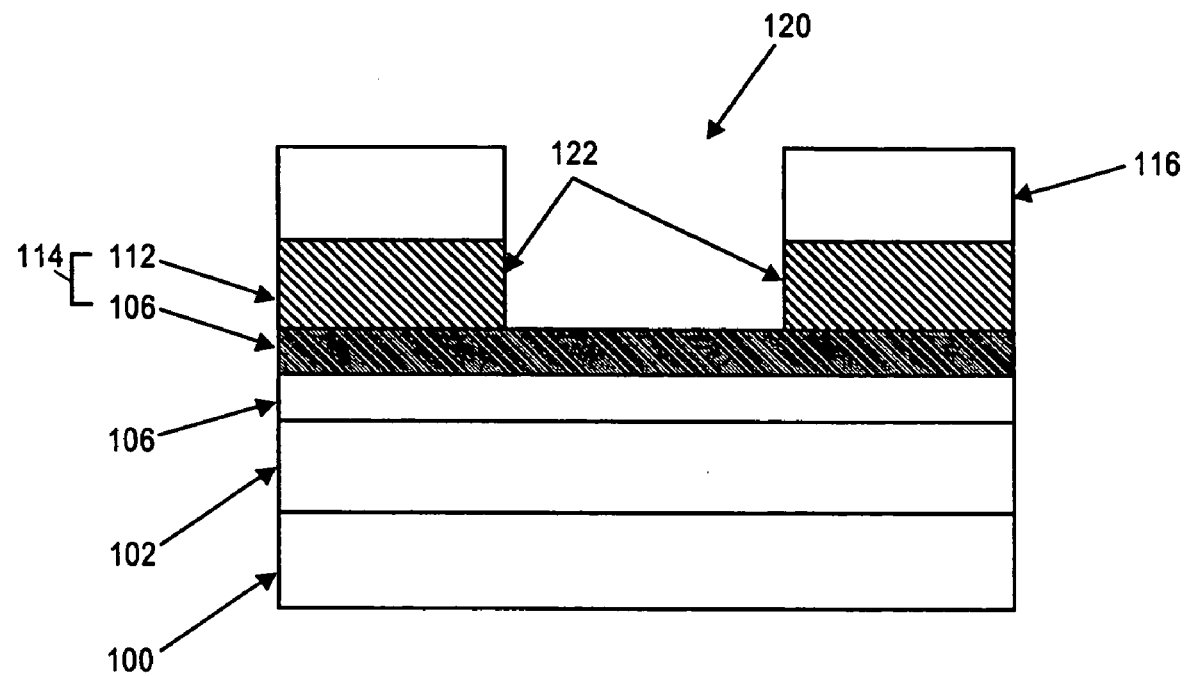
Figure 1D:
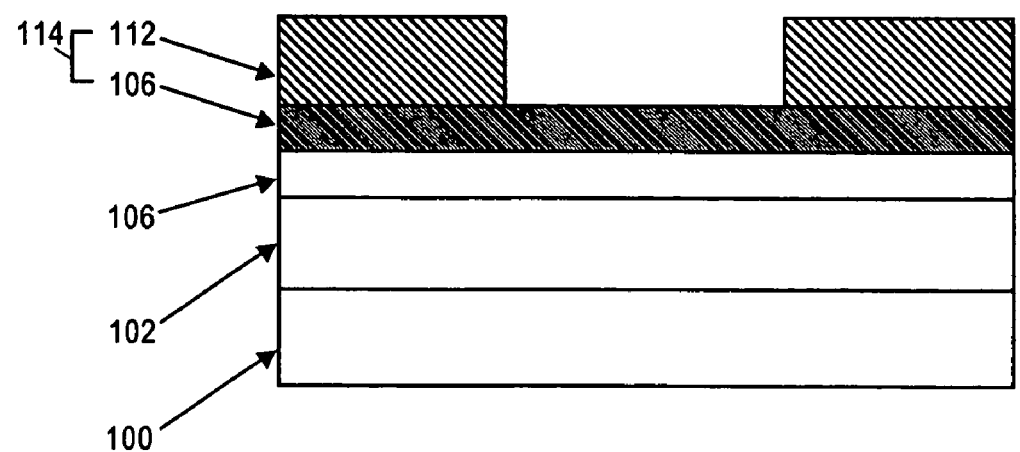
Figure 1E:
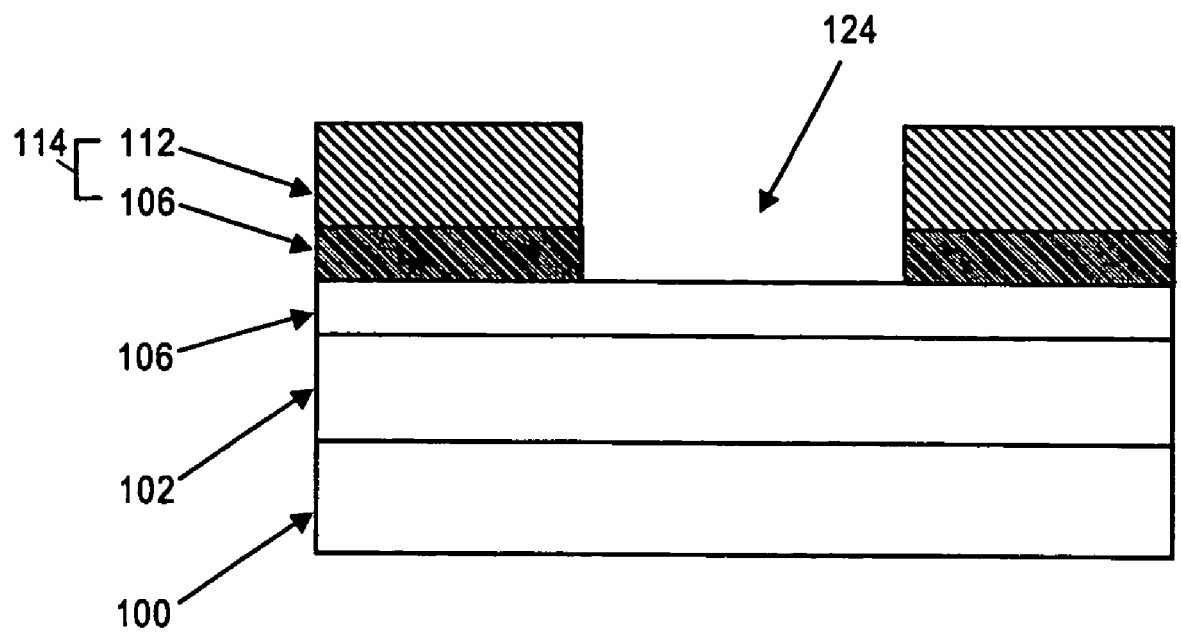

As shown in FIG. 1B, a radiation sensitive layer, such as a photoresist layer ("resist layer"), is deposited upon the tantalum nitride layer, preferably using conventional coating techniques. The resist layer (116) is patterned using conventional techniques to form a trench (118), subsequent to which the dimensions of the post-develop trench (118) are measured for critical dimension confirmation. As shown in FIG. 1C, subsequent to patterning of the resist layer (116), the pattern is transferred into the tantalum nitride mask absorber layer by introducing a plasma to etch through the tantalum nitride material. The plasma etch for the tantalum nitride may comprise, for example, chlorine gas (Cl2) at a flow rate of about 100 standard cubic centimeters per minute ("sccm") with a power of about 400 watts, magnetic field of about 150 gauss, and pressure of about 60 milliTorr. Chlorine plasma etch chemistries ("chlorine plasma") such as the aforementioned one are known to be effective on many materials used in microelectronic processing and manufacture, such as tantalum nitride, and in this application are advantageous for relatively anisotropic and fast etching, as described above. The chromium mask absorber layer (106) serves as an etch stop layer where oxygen is not present in the chlorine etch, as described above. After etching through the tantalum nitride layer, the enlarged trench (120) has sidewalls (122) which are longer in length, and substantially parallel due to the substantial lack of negative etch bias possible with tantalum nitride and chlorine plasma etching. Referring to FIG. 1D, the resist layer (116) of FIG. 1C is removed using conventional techniques, subsequent to which the chromium mask absorber layer (106) may be etched by introducing a plasma etch chemistry preferably comprising chlorine and oxygen (a "chlorine and oxygen plasma"), as depicted in FIG. 1E. The chlorine and oxygen plasma may comprise, for example, a chlorine gas flow of about 32 sccm, an oxygen gas flow of about 8 sccm, and a helium gas flow of about 60 sccm, introduced at a chamber pressure of about 5 milliTorr with upper and lower RF electrode powers of about 250 watts and about 4 watts, respectively. The relatively slow etch rate of the chlorine and oxygen plasma upon the chromium mask absorber layer (106) facilitates very controllable etch stoppage at the buffer layer (104) when the etching has progressed through the chromium material to form a deeper trench (124), as depicted in FIG. 1E.

Figure 1F:
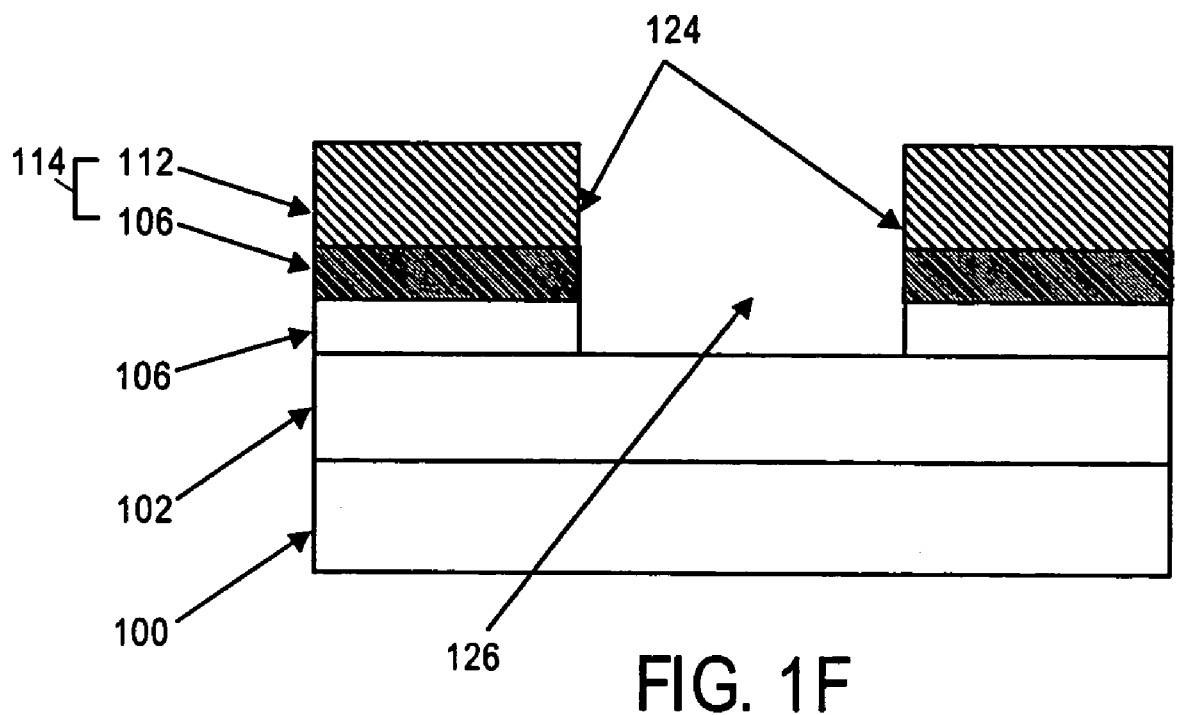

Referring to FIG. 1F, subsequent to etching the chromium mask absorber layer (106), the buffer layer (104) is etched, preferably using a different etch chemistry, such as a fluorine based etch chemistry. For example, an etch chemistry comprising trifluoromethane, oxygen, and nitrogen at about 20 sccm, about 2 sccm, and about 50 sccm (a "fluorine and oxygen plasma"), respectively, may be utilized. Subsequent to etching the buffer layer (104), the deepened trench (126) with substantially straight and parallel sidewalls (130) provides the reflective multi-layer (102) with access to incident EUV radiation directed through the trench (126), the trench (126) preferably having an aspect ratio of about 1.0, defined as the depth of the trench (126) divided by the width of the trench (126). In one embodiment, for example, the deepened trench (126) preferably has an aspect ratio of about 1.0 and a depth of about 90 nanometers.

Figure 1G:
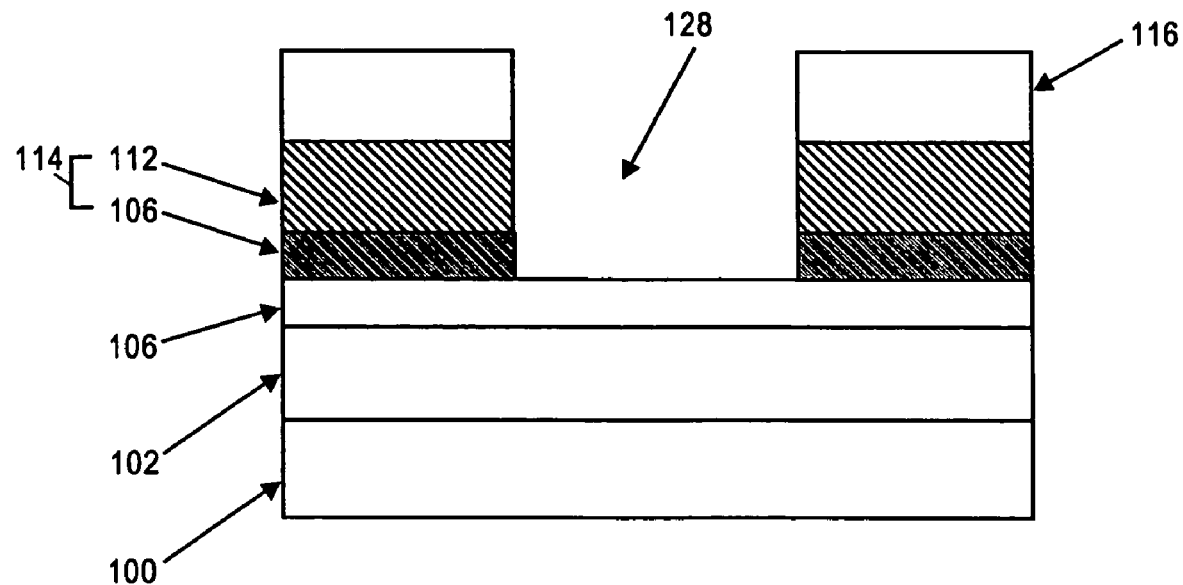
Figure 1H:
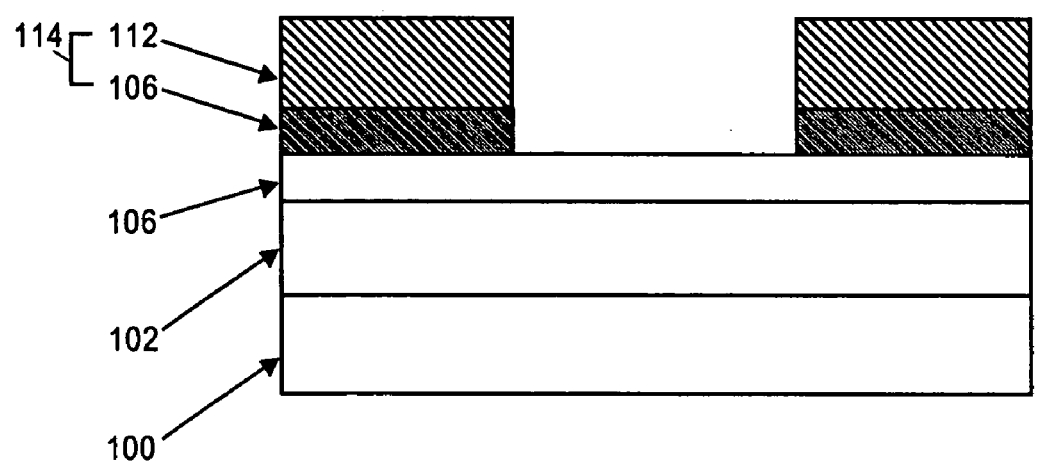
Figure 1I:
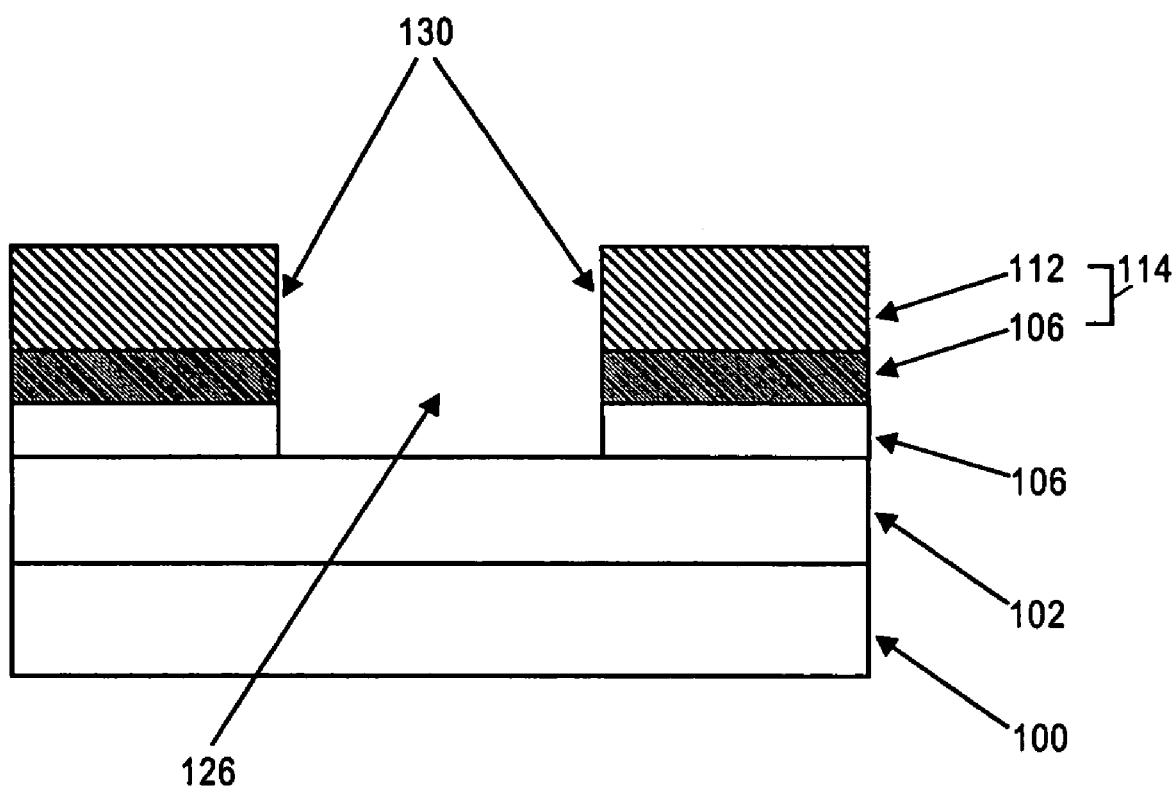

Referring to FIGS. 1G-1I, a variation of the embodiment described above is illustrated, wherein both layers of the composite mask absorber layer (114) are etched before removal of the resist layer (116). Referring to FIG. 1G, etching through both the tantalum nitride and chromium mask absorber layers (112, 106) may be accomplished using the same chlorine plasma and adding oxygen to etch through the chromium material. If a pause in etching is desired for control purposes, the chlorine plasma may be introduced and allowed to etch through the tantalum nitride material with the chromium material acting as an etch stop, subsequent to which oxygen may be added to the plasma to continue etching through the chromium material. After both mask absorber layers (112, 106) are etched and the trench (128) has been deepened as shown in FIG. 1G, the resist layer may be removed, as depicted in FIG. 1H. Subsequently, as shown in FIG. 1I, the trench (126) may be deepened by etching through the buffer layer (104) as described above, to leave a trench (126) with substantially straight and parallel sidewalls (130) providing the reflective multi-layer (102) with access to incident radiation directed through the trench (126), the trench (126) preferably having an aspect ratio of about 1.0, defined as the depth of the trench (126) divided by the width of the trench (126).

Figure 2:
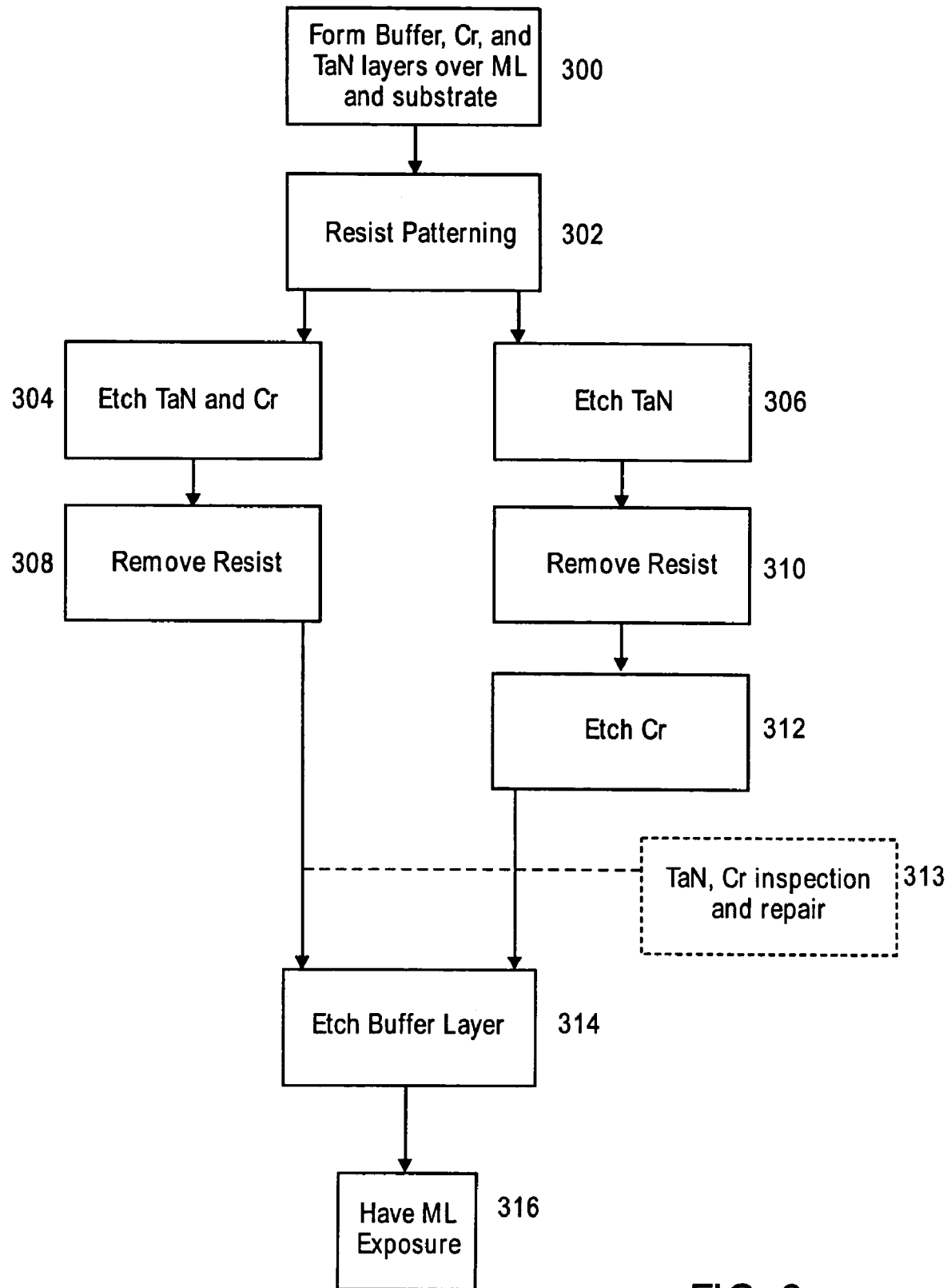
FIG. 2 is a flowchart illustrating various aspects of the present invention.

Referring to FIG. 2, a flowchart is depicted to illustrate the two embodiments described above. In one embodiment, after forming the buffer layer, chromium mask absorber layer, and tantalum nitride absorber layer over the reflective multi-layer and substrate layer (300), resist patterning (302) is followed by etching of both the tantalum nitride and chromium mask absorber layers (304), subsequent to which the resist is removed (308) and the buffer layer is etched (314), providing the reflective multi-layer with exposure to incident radiation (316). In another embodiment, after forming the buffer layer, chromium mask absorber layer, and tantalum nitride absorber layer over the reflective multi-layer and substrate layer (300), resist patterning (302) is followed by etching the tantalum nitride mask absorber layer (306), then resist removal (310), and etching of the chromium mask absorber layer (312), followed by buffer layer etching (314) to provide the reflective multi-layer with exposure to incident radiation (316). As shown in FIG. 2, before etching the buffer layer (314), the tantalum nitride and chromium mask absorber layers may be inspected for defects, and the defects repaired (313) for proper critical dimension control using conventional techniques, as would be apparent to one skilled in the art.

Thus, a novel EUV mask absorber solution is disclosed. Although the invention is described herein with reference to specific embodiments, many modifications therein will readily occur to those of ordinary skill in the art. Accordingly, all such variations and modifications are included within the intended scope of the invention as defined by the following claims.

The invention claimed is:

1. A method of forming a EUV mask comprising:
providing a substrate layer;
forming a reflective multi-layer over said substrate layer;
forming a buffer layer over said reflective multi-layer;
forming a first EUV mask absorber over said buffer layer;
forming a second EUV mask absorber over said first EUV mask absorber,
  wherein said second EUV mask absorber etches much more anisotropically as compared with said first EUV mask absorber,
  wherein said second EUV mask absorber etches relatively fast as compared with said first EUV mask absorber, and
  wherein said second EUV mask absorber layer is more than about two times as thick as said first EUV mask absorber layer;
forming a trench through said second EUV mask absorber;
deepening said trench through said first EUV mask absorber;
deepening said trench through said buffer layer; and
providing said reflective multi-layer with access to incident radiation directed through said trench, wherein opposing sidewalls of said deepened trench are substantially straight and parallel.

2. The method of claim 1 wherein said first EUV mask absorber comprises chromium.

3. The method of claim 1 wherein said second EUV mask absorber comprises tantalum nitride.

4. The method of claim 1 wherein said first EUV mask absorber is substantially homogeneous.

5. The method of claim 1 wherein said second EUV mask absorber is substantially homogeneous.

6. The method of claim 1 wherein forming said first EUV mask absorber and forming said second EUV mask absorber comprises forming a dual-layer EUV mask absorber.

7. The method of claim 1 wherein said first EUV mask absorber is an etch-stop layer when forming a trench through said second EUV mask absorber.

* * * * *